(12) United States Patent
Cohen et al.

(10) Patent No.: US 7,606,230 B1
(45) Date of Patent: Oct. 20, 2009

(54) LINK AGGREGATION FOR ROUTED PORTS

(75) Inventors: Yuval Cohen, Raanana, IL (US); Nafea Bishara, San Jose, CA (US); Michael Orr, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 611 days.

(21) Appl. No.: 10/958,077

(22) Filed: Oct. 4, 2004

Related U.S. Application Data

(60) Provisional application No. 60/569,728, filed on May 10, 2004.

(51) Int. Cl.
*H04L 12/28* (2006.01)

(52) U.S. Cl. .................... 370/392; 370/401

(58) Field of Classification Search .............. None
See application file for complete search history.

(56) References Cited

U.S. PATENT DOCUMENTS

| | | | |
|---|---|---|---|
| 6,058,116 A | 5/2000 | Hiscock et al. | |
| 6,163,543 A | 12/2000 | Chin et al. | |
| 6,363,077 B1 | 3/2002 | Wong et al. | |
| 6,385,197 B1 | 5/2002 | Sugihara | |
| 6,456,962 B1 * | 9/2002 | Allingham et al. | 703/26 |
| 6,553,029 B1 | 4/2003 | Alexander | |
| 6,567,410 B1 * | 5/2003 | Perlman | 370/401 |
| 6,614,758 B2 | 9/2003 | Wong et al. | |
| 6,687,751 B1 | 2/2004 | Wils et al. | |
| 6,850,495 B1 * | 2/2005 | Baum et al. | 370/256 |
| 6,857,027 B1 * | 2/2005 | Lindeborg et al. | 709/239 |
| 6,956,824 B2 * | 10/2005 | Mark et al. | 370/242 |
| 2003/0002443 A1 * | 1/2003 | Basso et al. | 370/237 |
| 2003/0021283 A1 * | 1/2003 | See et al. | 370/401 |
| 2005/0041590 A1 * | 2/2005 | Olakangil et al. | 370/238 |
| 2005/0135357 A1 * | 6/2005 | Riegel et al. | 370/389 |

OTHER PUBLICATIONS

"802.16 IEEE Standard for Local and Metropolitan Area Networks; Part 16: Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.
IEEE Standard 802.20-PD-06, Draft 802.20 Permanent Document, System Requirements for IEEE 802.20 Mobile Broadband Wireless Access Systems—Version 14, Jul. 16, 2004, pp. 1-24.

* cited by examiner

*Primary Examiner*—Jayanti K Patel
*Assistant Examiner*—Jung Park

(57) ABSTRACT

A wireless network apparatus and corresponding method and computer program comprises a plurality of ports to transmit and receive data flows comprising packets of data; a memory to store a routing table; a forwarding engine to transfer the packets of data between the ports according to the routing table; and a processor to define a routing interface comprising a selected group of the ports, map a selected media access control (MAC) address to the routing interface, disable link aggregation between the ports in the routing interface, disable bridging between the ports in the routing interface, and modify the routing table to direct each of the data flows having the MAC address as a destination address to one of the ports in the routing interface.

21 Claims, 2 Drawing Sheets

LINK AGGREGATION FOR ROUTED PORTS

CROSS-REFERENCE TO RELATED APPLICATIONS

This application claims the benefit of U.S. Provisional Patent Application Ser. No. 60/569,728 entitled "Routed Trunks," filed May 10, 2004, the disclosure thereof incorporated by reference herein in its entirety.

BACKGROUND

The present invention relates generally to network communications. More particularly, the present invention relates to link aggregation in a network device.

The growing popularity of high-speed data communications has led to an increasing demand for high-bandwidth data channels that exceed the bandwidth of existing communication links. A solution that has enjoyed widespread acceptance is link aggregation, often referred to as "layer-2 trunking" or "trunking."

Link aggregation is a method of combining multiple physical data communication links to form a single logical link, thereby increasing the capacity and availability of the communication channels between network devices such as servers, switches, end stations, and other network-enabled devices. For example, two or more Gigabit Ethernet or Fast Ethernet connections between two network devices can be combined to increase bandwidth capability and to create resilient and redundant links.

Link aggregation also provides load balancing, which is especially important for networks where it is difficult to predict the volume of data directed to each network device. Link aggregation distributes processing and communications activity evenly across a network so that no single network device is overwhelmed.

Link aggregation is documented in the Institute of Electrical and Electronics Engineers (IEEE) standard 802.3ad, which is incorporated by reference herein in its entirety.

However, conventional network devices employ silicon mechanisms to provide link aggregation, and so are limited in the number of trunks they can provide. Furthermore, many conventional network devices do not permit link aggregation at all.

SUMMARY

In general, in one aspect, the invention features a wireless network apparatus and corresponding method and computer program. It comprises a plurality of ports to transmit and receive data flows comprising packets of data; a memory to store a routing table; a forwarding engine to transfer the packets of data between the ports according to the routing table; and a processor to define a routing interface comprising a selected group of the ports, map a selected media access control (MAC) address to the routing interface, disable link aggregation between the ports in the routing interface, disable bridging between the ports in the routing interface, and modify the routing table to direct each of the data flows having the MAC address as a destination address to one of the ports in the routing interface.

Particular implementations can include one or more of the following features. The processor modifies the routing table entries for the ports in the routing interface to provide load balancing among the ports in the routing interface. The load balancing is based on Equal Cost Multi-Path Routing Protocol (ECMP). To define a routing interface, the processor allocates a virtual local-area network (VLAN) to the selected group of the ports. A multi-layer switch comprises the network device.

The details of one or more implementations are set forth in the accompanying drawings and the description below. Other features will be apparent from the description and drawings, and from the claims.

Figure 1:
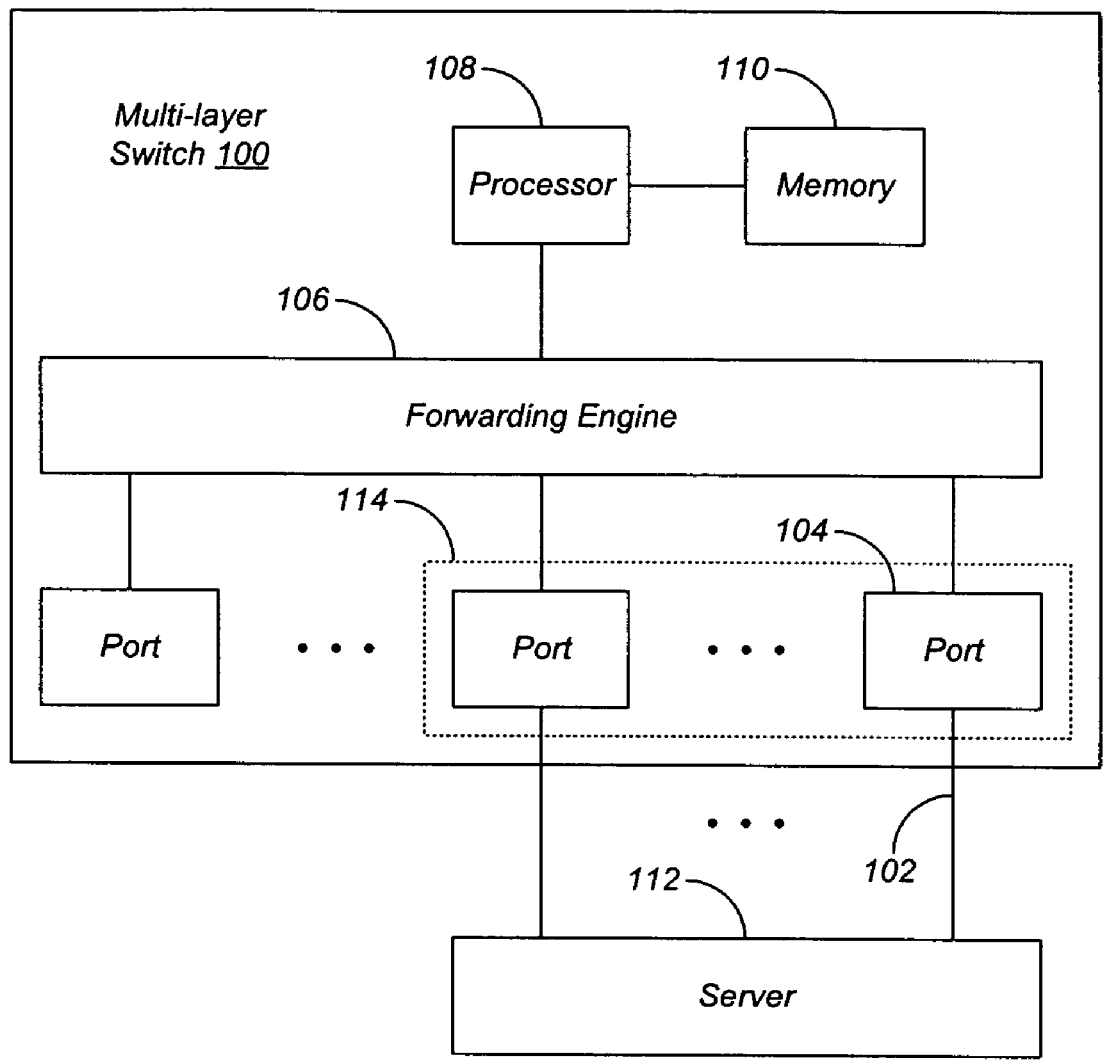
FIG. 1 shows a multi-layer switch in communication with a server over network links according to a preferred embodiment.

The leading digit(s) of each reference numeral used in this specification indicates the number of the drawing in which the reference numeral first appears.

DETAILED DESCRIPTION

Embodiments of the present invention employ routing techniques, for example in a multi-layer switch, to implement link aggregation without using conventional layer-2 link aggregation techniques, thereby creating what are referred to herein as "routed trunks." A significant advantage of these routed trunks is that the number of routed trunks a switch can employ is not restricted by any link aggregation limit of the switch. Large numbers of routed trunks are especially useful when communicating with a large number of servers, which often requires a number of trunks that exceeds the link aggregation limit of conventional switches.

Network devices employing the routed trunks of the present invention are compatible with existing networks such as the Internet. The techniques disclosed herein are internal to the device employing them, and are transparent to other devices which can, but need not, employ those techniques. Thus embodiments of the present invention have broad applicability.

FIG. 1 shows a multi-layer switch 100 in communication with a network device 112 such as a server over network links 102 according to a preferred embodiment. A multi-layer switch is a switch that combines aspects of data link layer switches and network-layer switches, as is well-known in the relevant arts. But although embodiments of the present invention are described with respect to a multi-layer switch, these embodiments are applicable to other sorts of network devices such as routers and the like. In addition, although embodiments of the present invention are described as establishing routed trunks with a server, these embodiments are equally applicable in establishing routed trunks with other sorts of network devices such as network switches and the like.

Multi-layer switch 100 comprises a plurality of ports 104, a forwarding engine 106, a processor 108, and a memory 110. Ports 104 transmit and receive data flows comprising packets of data. A data flow is an ordered set of packets transmitted from one network device to another, as is well-known in the relevant arts. Forwarding engine 106 transfers the packets between ports 104 according to entries in routing tables stored in memory 110 according to techniques well-known in the relevant arts. Processor 108 creates and modifies the routing tables according to other well-known techniques such as learning.

Figure 2:
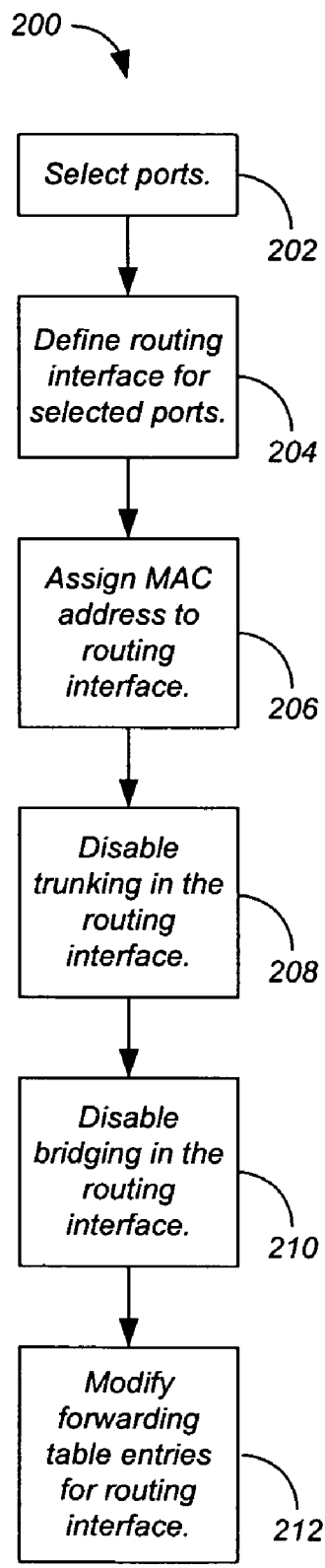
FIG. 2 shows a process for the multi-layer switch of FIG. 1 to establish a routed trunk with the server of FIG. 1 according to a preferred embodiment.

FIG. 2 shows a process 200 for multi-layer switch 100 to establish a routed trunk with server 112 according to a preferred embodiment. First a group 114 of the ports 104 that are in communication with server 112 is selected for routed link aggregation (step 202). The group 114 of ports 104 can be selected by the user manually or with the help of some automated process such as the link aggregation control protocol (LACP) documented in the Institute of Electrical and Electronics Engineers (IEEE) standard 802.3ad, which is incorporated by reference herein in its entirety.

Processor 108 then defines a routing interface comprising the selected group 114 of ports 104 according to techniques well-known in the relevant arts (step 204). In some embodiments, the routing interface is defined by allocating a virtual local-area network (VLAN) to the selected group 114 of ports 104. VLANs are documented in the Institute of Electrical and Electronics Engineers (IEEE) standard 802.3q, which is incorporated by reference herein in its entirety.

Processor 108 assigns one of the media access control (MAC) addresses belonging to multi-layer switch 100 to the routing interface (step 206).

As mentioned above, the routed trunks of the present invention provide the benefits and appearance of conventional link aggregation without employing conventional trunking, thereby permitting more trunks that conventional switches allow. Therefore, to prevent multi-layer switch 100 from employing conventional layer-2 trunking, processor 108 disables layer-2 link aggregation between the ports 104 in the routing interface (step 208).

If bridging were enabled between the ports 104 in the selected group 114, traffic received from server 112 by one port 104 in the group 114 could be sent back to server 112 by one or more of the other ports 104 in the group 114. To prevent this problem, processor 108 disables bridging between the ports 104 in the routing interface (step 210).

As mentioned above, a data flow is an ordered set of packets transmitted from one network device to another. As long as the order of the packets in each data flow is preserved, a network switch can employ any mechanism for trunking. To ensure that the packet order is preserved, processor 108 modifies the routing table to direct each of the data flows having the routing interface's MAC address as a destination address to one of the ports 104 in the routing interface (step 212).

Processor 108 optionally modifies the routing table entries in memory 110 for the ports 104 in the routing interface to provide load balancing among the ports 104 in the routing interface. One well-known routing protocol that can be used for load balancing is the Equal Cost Multi-Path Routing Protocol (ECMP), which provides multiple routed paths to an end destination. Again, as long as packet order is preserved within each data flow, any load-balancing technique can be used, while still maintaining compliance with applicable standards such as IEEE standards.

The routed trunk comprising the links between the selected group 114 of ports 104 and server 112 now performs in the same manner as a conventional trunk. Server 112 need not perform routed trunking, and indeed needs no knowledge of the routed trunking. To server 112, the routed trunk appears the same as a conventional layer-2 trunk. The techniques described above can be used to establish additional routed trunks to server 112 or to other servers. Because these techniques are implemented using layer-3 mechanisms, the maximum number of trunks that multi-layer switch 100 can provide is limited only by the size of the routing table, which can be very large, rather than by the silicon area of switch 100, as is the case in conventional layer-2 trunking.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
a plurality of ports to transmit and receive data flows comprising packets of data;
a memory to store a routing table;
a forwarding engine to transfer the packets of data between the ports according to the routing table; and
a processor to
define a routing interface comprising a selected group of the ports,
map a selected media access control (MAC) address to the routing interface,
disable link aggregation between the selected group of the ports of the routing interface,
disable bridging between the selected group of the ports of the routing interface without disabling the selected group of the ports, and
modify the routing table to direct each of the data flows having the MAC address as a destination address to one of the selected group of the ports of the routing interface.

2. The network device of claim 1:
wherein the processor modifies the routing table entries for the selected group of the ports of the routing interface to provide load balancing among the selected group of the ports of the routing interface after disabling bridging between the selected group of the ports.

3. The network device of claim 2:
wherein the load balancing is based on Equal Cost Multi-Path Routing Protocol (ECMP).

4. The network device of claim 1, wherein, to define a routing interface, the processor allocates a virtual local-area network (VLAN) to the selected group of the ports.

5. A network device comprising:
a plurality of port means for transmitting and receiving data flows comprising packets of data;
memory means for storing a routing table;
forwarding means for transferring the packets of data between the port means according to the routing table; and
processing means for
defining a routing interface comprising a selected group of the port means,
mapping a selected media access control (MAC) address to the routing interface,
disabling link aggregation between the selected group of the port means of the routing interface,
disabling bridging between the selected group of the port means of the routing interface without disabling the selected group of the port means, and
modifying the routing table to direct each of the data flows having the MAC address as a destination address to one of the selected group of the port means of the routing interface.

6. The network device of claim 5:
wherein the processing means modifies the routing table entries for the port means in the routing interface to provide load balancing among the port means in the routing interface after disabling bridging between the selected group of the port means.

7. The network device of claim 6:
wherein the load balancing is based on Equal Cost Multi-Path Routing Protocol (ECMP).

8. The network device of claim 5, wherein, to define a routing interface, the processing means allocates a virtual local-area network (VLAN) to the selected group of the port means.

9. A method for a network device having a plurality of ports for transmitting and receiving data flows comprising packets of data according to a routing table, the method comprising:
defining a router interface comprising a selected group of the ports;
mapping a Media Access Control (MAC) address to the router interface;
disabling link aggregation between the selected group of the ports of the routing interface;
disabling bridging between the selected group of the ports of the routing interface without disabling the selected group of the ports; and
modifying the routing table to direct each of the data flows having the MAC address as a destination address to one of the selected group of the ports of the routing interface.

10. The method of claim 9, further comprising:
modifying the routing table entries for the selected group of the ports of the routing interface to provide load balancing among the selected group of the ports of the routing interface after disabling bridging between the selected group of the ports.

11. The method of claim 10:
wherein the load balancing is based on Equal Cost Multi-Path Routing Protocol (ECMP).

12. The method of claim 9, wherein defining a routing interface comprises:
allocating a virtual local-area network (VLAN) to the selected group of the ports.

13. A computer readable medium storing a computer program capable of being executed by a computer for a network device having a plurality of ports for transmitting and receiving data flows comprising packets of data according to a routing table, the computer program comprising:
defining a router interface comprising a selected group of the ports;
mapping a Media Access Control (MAC) address to the router interface;
disabling link aggregation between the selected group of the ports of the routing interface;
disabling bridging between the selected group of the ports of the routing interface without disabling the selected group of the ports; and
modifying the routing table to direct each of the data flows having the MAC address as a destination address to one of the selected group of the ports of the routing interface.

14. The computer readable medium of claim 13, further comprising:
modifying the routing table entries for the selected group of the ports of the routing interface to provide load balancing among the selected group of the ports of the routing interface after disabling bridging between the selected group of the ports.

15. The computer readable medium of claim 14:
wherein the load balancing is based on Equal Cost Multi-Path Routing Protocol (ECMP).

16. The computer readable medium of claim 13, wherein defining a routing interface comprises:
allocating a virtual local-area network (VLAN) to the selected group of the ports.

17. A first network device comprising:
X ports within the first network device that transmit and receive data flows comprising packets of data with a second network device that has a media access control (MAC) address;
memory that stores a routing table;
a forwarding engine to transfer the packets of data between the X ports according to the routing table; and
a processor to
define a routing interface comprising Y of the X ports,
map said MAC address to the routing interface,
disable link aggregation between the Y of the X ports of the routing interface,
disable bridging between the Y of the X ports without disabling the Y of the X ports, and
modify the routing table to direct each of the data flows having the MAC address as a destination address to one of the Y of the X ports, where X is an integer greater than 1 and where Y is less than X.

18. The network device of claim 17:
wherein the processor modifies the routing table entries for the Y of the X ports of the routing interface to provide load balancing among the Y of the X ports of the routing interface after disabling bridging between the Y of the X ports.

19. The network device of claim 18:
wherein the load balancing is based on Equal Cost Multi-Path Routing Protocol (ECMP).

20. The network device of claim 17, wherein, to define a routing interface, the processor allocates a virtual local-area network (VLAN) to the selected group of the ports.

21. The network device of claim 17, wherein the processor disables link aggregation between the Y of the X ports without disabling link aggregation between X-Y of the X ports that are not members of the Y of the X ports of the routing interface.

* * * * *